United States Patent
Sinn et al.

(10) Patent No.: US 11,474,420 B2
(45) Date of Patent: Oct. 18, 2022

(54) IMAGE PROJECTION DEVICE

(71) Applicant: SK TELECOM CO., LTD., Seoul (KR)

(72) Inventors: Dong Youb Sinn, Seoul (KR); Yong Woo Bae, Seoul (KR); Seung Ho Shin, Seoul (KR); Jae Hwang Yu, Seoul (KR); Hak Soon Lee, Seoul (KR); Guk Chan Lim, Seoul (KR); Ku Ik Chung, Seoul (KR); Jin Yong Han, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/146,285

(22) Filed: Jan. 11, 2021

(65) Prior Publication Data

US 2021/0132480 A1     May 6, 2021

Related U.S. Application Data

(63) Continuation-in-part of application No. PCT/CT2019/002154, filed on Feb. 21, 2019.

(30) Foreign Application Priority Data

Jul. 12, 2018   (KR) .................. 10-2018-0081240
Jul. 13, 2018   (KR) .................. 10-2018-0081615
Jul. 13, 2018   (KR) .................. 10-2018-0081772

(51) Int. Cl.
  *G03B 21/14*   (2006.01)
  *G02B 5/10*    (2006.01)
  (Continued)

(52) U.S. Cl.
  CPC ............. *G03B 21/147* (2013.01); *G02B 5/10* (2013.01); *G02B 13/18* (2013.01); *G03B 21/28* (2013.01)

(58) Field of Classification Search
  CPC .......... G02B 13/16; G02B 13/18; G02B 5/10; G03B 21/147; G03B 21/10; G03B 21/28; G03B 21/56
  See application file for complete search history.

(56) References Cited

U.S. PATENT DOCUMENTS

8,279,527 B2 *  10/2012  Lin ................... G02B 13/06
                                                    359/728
9,229,206 B2 *  1/2016   Tatsuno .............. G03B 21/147
                          (Continued)

FOREIGN PATENT DOCUMENTS

JP    2003-156683 A    5/2003
JP    2005-115312 A    4/2005
                 (Continued)

OTHER PUBLICATIONS

PCT International Search Report, PCT Application No. PCT/KR2019/002154, dated Jun. 10, 2019, five pages.

*Primary Examiner* — Magda Cruz
(74) *Attorney, Agent, or Firm* — Fenwick & West LLP

(57) ABSTRACT

An image projection device includes: a panel unit configured to emit light rays; a projection optical system configured to receive the light rays emitted from the panel unit and to refract the light rays; a reflection unit having a reflection surface for receiving the light rays refracted by the projection optical system and reflecting the light rays; and a screen unit configured to display an image upon receiving the light rays reflected from the reflection surface. The panel unit, the projection optical system, the reflection unit, and the screen unit are arranged such that a distance of a shortest path among paths extending from the panel unit to the reflection unit through the projection optical system along a predetermined linear axis is longer than a distance of a longest path (Continued)

among paths extending from the reflection unit to the screen unit along the predetermined linear axis.

17 Claims, 17 Drawing Sheets

(51) Int. Cl.
    *G02B 13/18*     (2006.01)
    *G03B 21/28*     (2006.01)

(56) References Cited

U.S. PATENT DOCUMENTS

| | | | |
|---|---|---|---|
| 9,864,177 B2* | 1/2018 | Takano | G02B 15/1421 |
| 2007/0253076 A1* | 11/2007 | Takaura | G02B 17/08 |
| | | | 359/780 |
| 2009/0009730 A1* | 1/2009 | Destain | G03B 21/28 |
| | | | 353/121 |
| 2010/0238416 A1* | 9/2010 | Kuwata | G03B 21/28 |
| | | | 359/728 |
| 2011/0038039 A1 | 2/2011 | Takaura et al. | |
| 2015/0029474 A1* | 1/2015 | Tatsuno | G02B 17/08 |
| | | | 353/97 |
| 2015/0309323 A1* | 10/2015 | Park | G02B 17/08 |
| | | | 353/8 |

FOREIGN PATENT DOCUMENTS

| | | |
|---|---|---|
| JP | 2010-244017 A | 10/2010 |
| JP | 2014-228576 A | 12/2014 |
| JP | 2015-172608 A | 10/2015 |
| JP | 2016-138962 A | 8/2016 |
| JP | 2018-005253 A | 1/2018 |
| KR | 10-2006-0125346 A | 12/2006 |

* cited by examiner

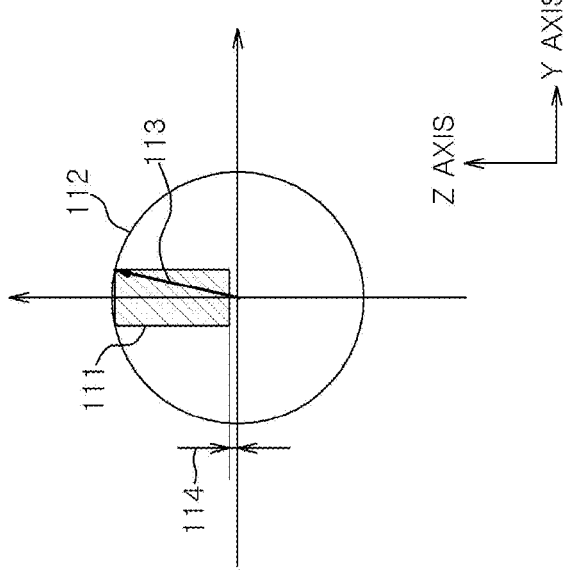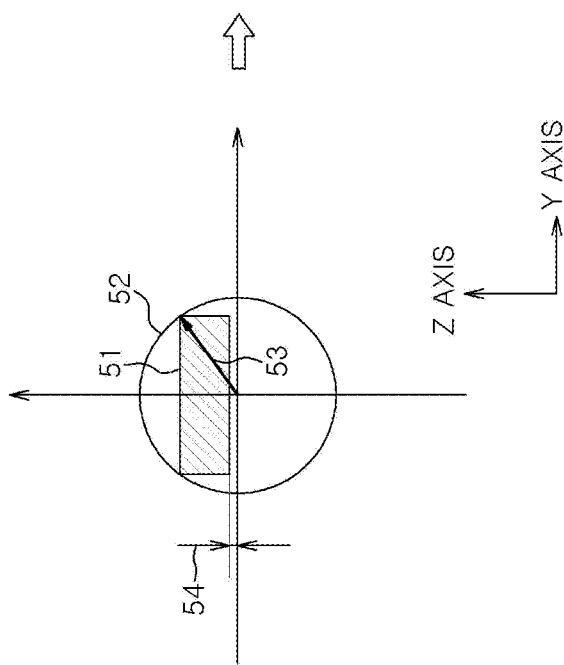

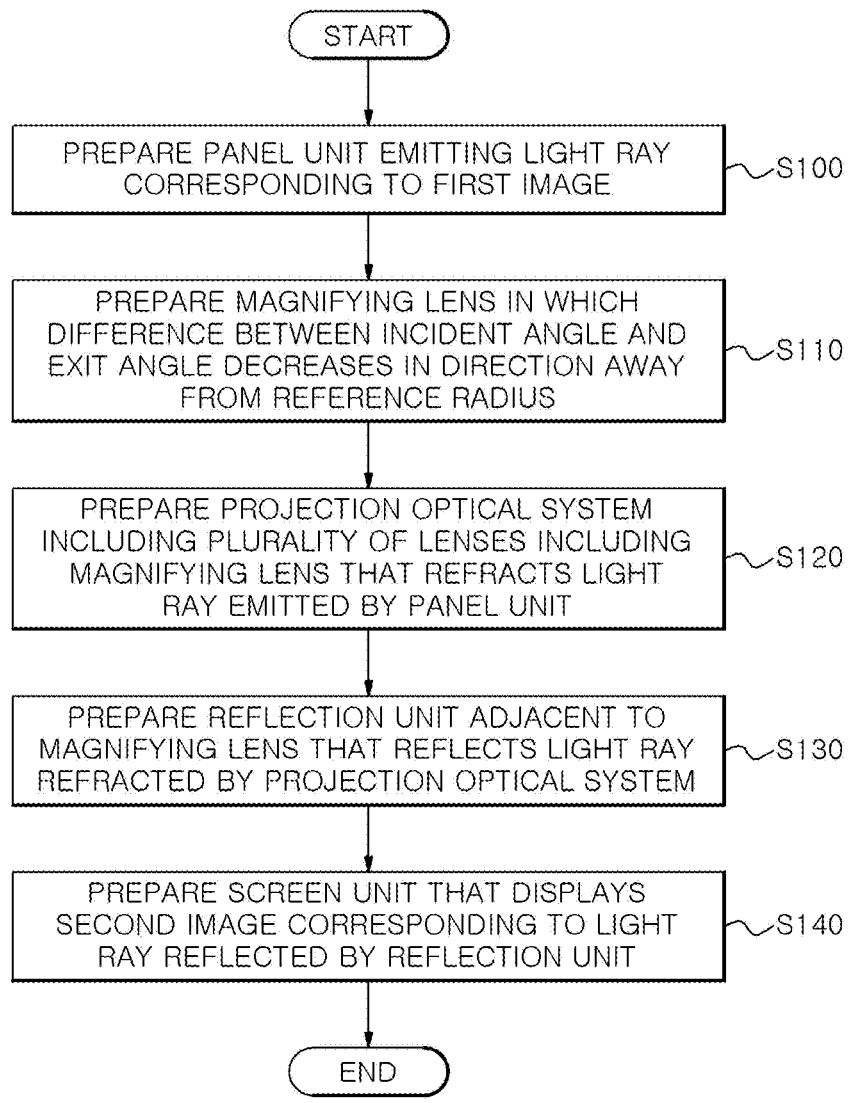

IMAGE PROJECTION DEVICE

CROSS-REFERENCE TO RELATED APPLICATIONS

This application is a bypass continuation-in-part application of International PCT Application No. PCT/KR2019/002154 filed on Feb. 21, 2019, which claims priority to Korean Patent Application No. 10-2018-0081240 filed on Jul. 12, 2018, Korean Patent Application No. 10-2018-0081615 filed on Jul. 13, 2018, and Korean Patent Application No. 10-2018-0081772, filed Jul. 13, 2018, the entire contents of which are incorporated herein for all purposes by this reference.

TECHNICAL FIELD

The present disclosure relates to an image projecting apparatus.

BACKGROUND

A beam projector, one of image projection devices, is a device that magnifies an image and projects the magnified image to a screen spaced apart from the beam projector by a certain distance. The beam projector may include a light source that generates and emits light rays, a panel that generates an image upon receiving the light rays emitted from the light source, a lighting optical system located between the light source and the panel to cause the light rays emitted from the light source to be concentrated on the panel, and a projection optical system located between the panel and the screen to magnify the image generated on the panel and project the magnified image to the screen. Such a beam projector is widely used in various spaces for various purposes. For example, the beam projector is used for lectures, presentations, or watching videos in a space such as a school, company, or home.

SUMMARY

In view of the above, the present disclosure provides a technology for an ultra-short throw (UST) beam projector capable of projecting an image even at an ultra-short distance, among the beam projectors, that is, having a projection distance shorter than that of a general beam projector.

For example, the present disclosure provides a UST beam projector capable of obtaining an effect of correcting astigmatism or chromatic aberration over a certain level and securing an imaging magnification over a certain level. Furthermore, the present disclosure provides a UST beam projector capable of preventing a user from feeling inconvenience due to light non-uniformity even though distortion of a projected image is corrected through image processing.

However, the problems to be solved by the present disclosure are not limited to those mentioned above, and other problems to be solved that are not mentioned may be evidently understood by a person skilled in the art from the following description.

In accordance with a first embodiment of the present disclosure, there is provided an image projection device including: a panel unit configured to emit light rays; a projection optical system configured to receive the light rays emitted from the panel unit and to refract the light rays; a reflection unit having a reflection surface for receiving the light rays refracted by the projection optical system and reflecting the light rays; and a screen unit configured to display an image upon receiving the light rays reflected from the reflection surface, wherein the panel unit, the projection optical system, the reflection unit, and the screen unit are arranged such that a distance of a shortest path among paths extending from the panel unit to the reflection unit through the projection optical system along a predetermined linear axis is longer than a distance of a longest path among paths extending from the reflection unit to the screen unit along the predetermined linear axis.

In accordance with a second embodiment of the present disclosure, there is provided an image projection device including: a panel unit longer in height in a vertical direction than in width in a horizontal direction; and a reflection unit having a reflection surface receiving a plurality of light rays forming an image on the panel unit and reflecting the light rays, wherein the reflection surface is provided in the reflection unit by reflecting positions of points which are maximally spaced apart from each other with respect to the width in the horizontal direction and positions of points which are maximally spaced apart from each other with respect to the height in the vertical direction, among at least two points included in the reflection unit predicted to receive the plurality of light rays forming the image on the panel unit and reflect the light rays.

According to an embodiment of the present disclosure, an image projection device having improved performance may be provided. For example, in such an image projection device, astigmatism correction or chromatic aberration correction may be performed above a certain level, and an imaging magnification may be secured above a certain level. In addition, the user may view video without feeling inconvenience due to light non-uniformity.

BRIEF DESCRIPTION OF THE DRAWINGS

FIGS. 6A and 6B are schematic conceptual diagrams showing effective image circles, dispositions of panel units, and image heights of a horizontal type image projection device and a vertical type image projection device according to the second embodiment.

FIG. 17 is a schematic flowchart of a process of manufacturing the image projection device according to the third embodiment.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms used henceforth are defined in consideration of the functions of the disclosure and may be altered according to the intent of a user or operator, or conventional practice. Therefore, the terms should be defined on the basis of the entire content of this disclosure.

Figure 1:
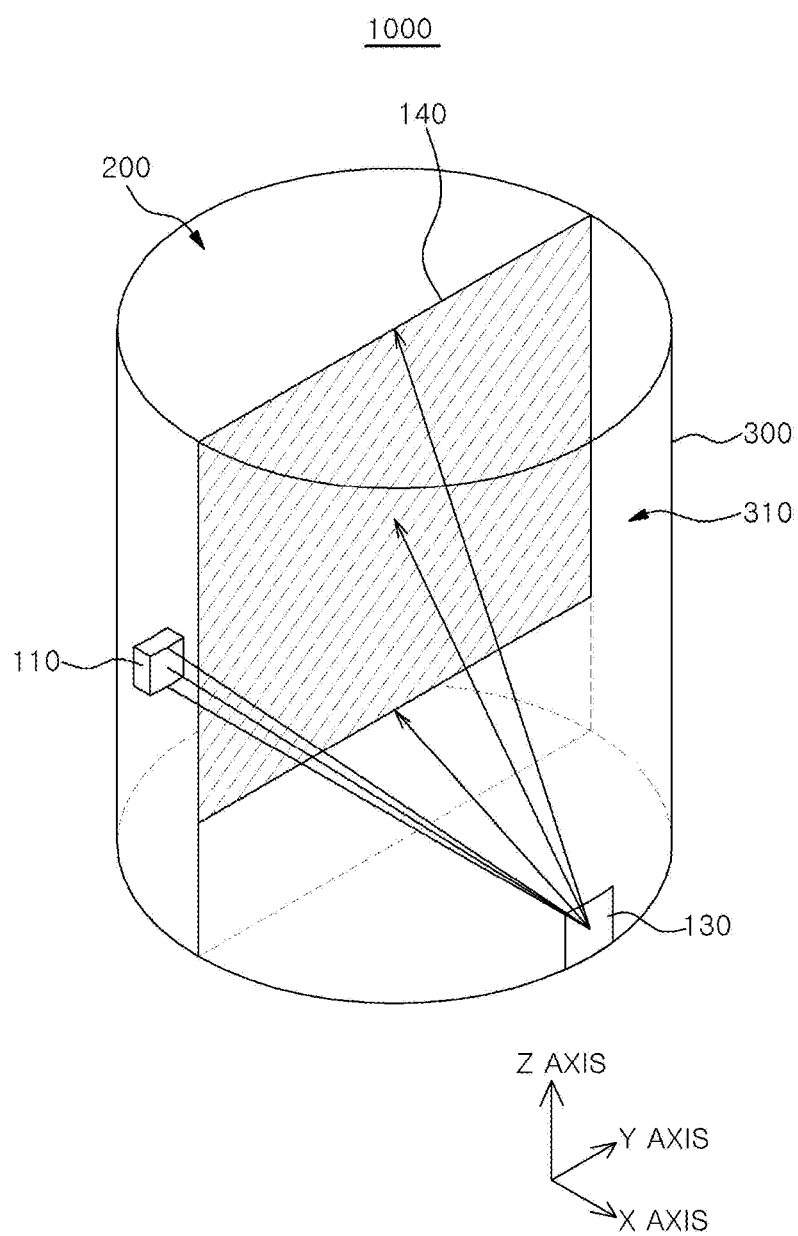
FIG. 1 is a schematic perspective view of an image projection device according to a first embodiment.
Figure 2:
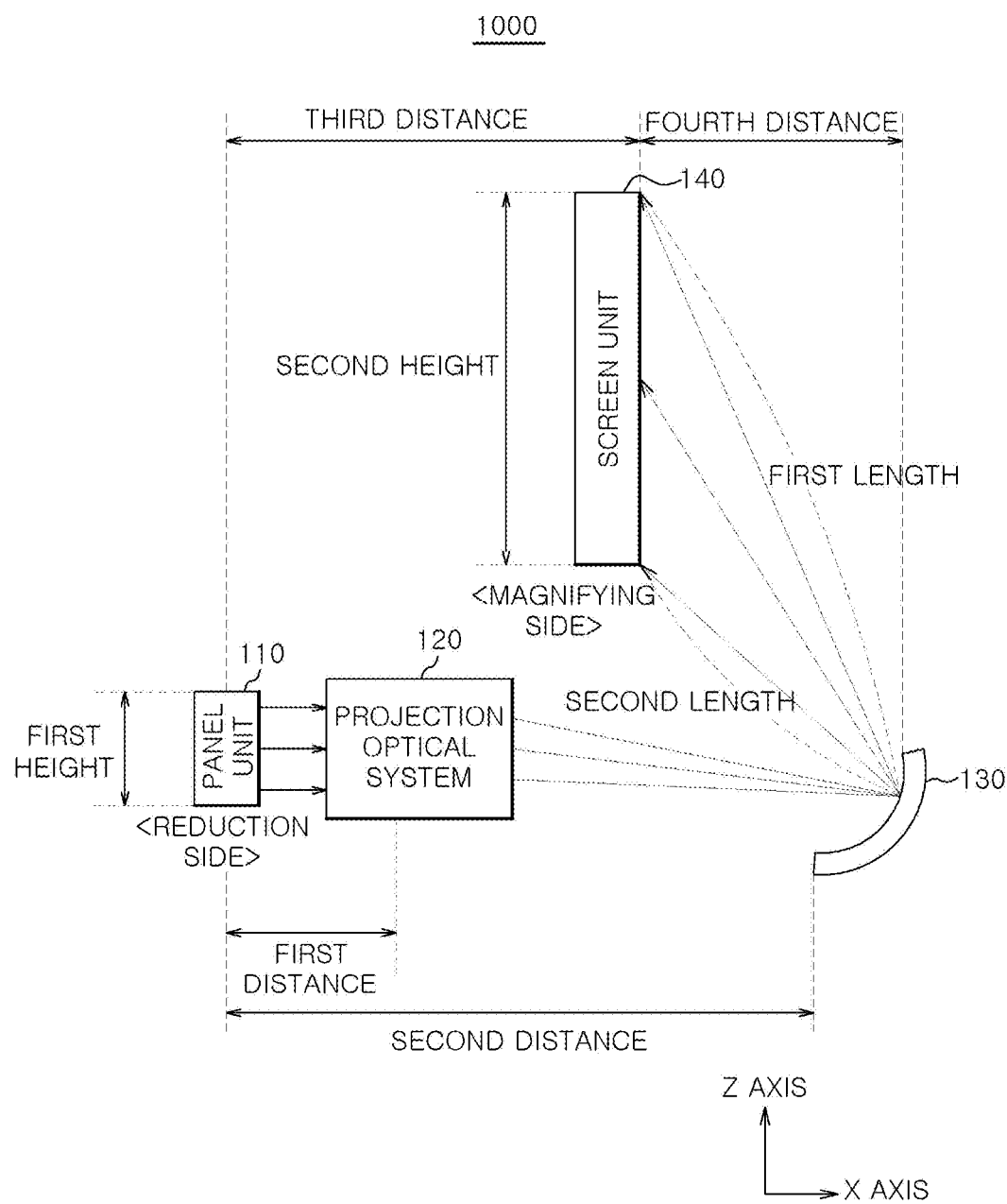
FIG. 2 is a schematic configuration diagram of an image projection device according to the first embodiment.

FIG. 1 is a schematic perspective view of an image projection device 1000 according to a first embodiment, and FIG. 2 is a schematic configuration diagram of the image projection device 1000 according to the first embodiment. However, since those shown in FIGS. 1 and 2 are merely exemplary, the spirit of the present disclosure is not limitedly interpreted through FIGS. 1 and 2. That is, the image projection device 1000 may additionally include components other than those illustrated or may not include some of the illustrated components.

Referring to FIGS. 1 and 2, the image projection device 1000 includes a panel unit 110, a projection optical system 120, a reflection unit 130, and a screen unit 140. In addition, although not shown in FIGS. 1 and 2, the image projection device 1000 may include components generally provided in a projector, such as a power supply unit, a light source unit, and an illumination optical system. In addition, the image projection device 1000 may include a case 200 in which these components are mounted.

Among these, the power supply unit is provided with power and delivers the power to the light source unit.

The light source unit generates light rays using power received from the power supply unit and emits the generated light rays. This light source unit may be implemented as an LED or the like.

After receiving the light rays emitted from the light source unit, the illumination optical system emits the light rays toward the panel unit 110 so that an image is formed on the panel unit 110. Such an illumination optical system may include a plurality of lenses.

The panel unit 110 forms an image upon receiving light rays from the illumination optical system. The light rays forming the image are transferred to the projection optical system 120.

The projection optical system 120 refracts light rays upon receiving the light rays from the panel unit 110. The refracted light rays are transferred to the reflection unit 130. The projection optical system 120 may include a plurality of lenses, and the projection optical system 120 will be described in more detail with reference to FIG. 3.

The reflection unit 130 includes a reflection surface. The light rays transferred from the projection optical system 120 are reflected from the reflection surface of the reflection unit 130. The reflection unit 130 will be described in more detail with reference to FIG. 4.

The screen unit 140 receives the light rays reflected from the reflection surface of the reflection unit 130. The transferred light rays form an image on the screen unit 140.

As for the case 200, a portion 300 may be formed of a transparent material to form an empty space 310, and the screen unit 140 may be disposed in the empty space 310. Accordingly, a user may recognize an image formed on the screen unit 140 through the portion 300 of the case 200 formed of such a transparent material.

Hereinafter, a process of forming an image in the aforementioned image projection device 1000 will be described.

The light source unit supplied with power from the power supply unit generates light rays, and the generated light rays are emitted and transferred to the panel unit 110 through the illumination optical system, thereby forming an image in the panel unit 110. The light rays forming the image in the panel unit 110 are transferred to the reflection unit 130 through the projection optical system 120 and then reflected by the reflection unit 130, and the reflected light rays are transferred to the screen unit 140. Then, an image is formed on the screen unit 140.

Here, the image projection device 1000 may be a beam projector. Therefore, based on a size of the image, the size of the image formed on the screen unit 140 may be larger than the image formed on the panel unit 110. In this sense, the panel unit 110 may be referred to as a "reduction side" and the screen unit 140 may be referred to as an "magnifying side".

Meanwhile, among different light rays emitted from a point on the panel unit 110, a main light ray may be emitted along a straight line perpendicular to the panel unit 110. That is, the optical system existing between the panel unit 110 and the screen unit 140 may have a telecentric feature. According to this feature, it is easy to uniformly implement the light source and energy loss in the light source may be reduced when a general light source and a refraction unit are combined.

Hereinafter, positions at which respective components of the image projection device 1000 are disposed will be described with reference to the panel unit 110.

First, although not shown in the drawing, the power supply unit, the light source unit, and the illumination optical system described above may be disposed near the panel unit 110 as shown in FIG. 2.

The projection optical system 120 is disposed at a position spaced apart from the panel unit 110 by a first distance (shown in FIG. 2) along a direction parallel to a predetermined linear axis (x-axis in FIG. 2).

The reflection unit 130 is disposed at a position spaced apart by a second distance (shown in FIG. 2) which is the shortest from the panel unit 110 to the reflection surface along a direction parallel to the aforementioned linear axis. Here, the second distance is longer than the first distance.

The screen unit 140 is disposed at a position spaced apart from the panel unit 110 by a third distance (shown in FIG. 2) along a direction parallel to the aforementioned linear axis. Here, the third distance is shorter than the second distance. In this case, when the longest distance from the reflection unit 130 to the screen unit 140 is a fourth distance (shown in FIG. 2), the fourth distance is shorter than the aforementioned second distance.

Here, the second distance may be referred to as an 'overall distance'. In addition, the fourth distance may be referred to as a 'projection distance' in that it is a distance over which light rays reflected from the reflection unit 130 are projected to the screen unit 140. Based on this, in the image projection device 1000 according to the first embodiment, the ratio of the projection distance to the overall distance is less than 1. In other words, the panel unit 110, the projection optical system 120, the screen unit 140, and the reflection unit 130 may be arranged such that a distance obtained by projecting the shortest distance among distances extending from the panel unit 110 to the reflection unit 130 through the projection optical system 120 to the predetermined linear axis (x axis) is longer than a distance obtained by projecting the longest distance among distances extending from the reflection unit 130 to the screen unit 140.

This means that even though the ratio of the projection distance to the overall distance is less than 1, that is, even though projection is performed at a very short distance, an image may be properly formed by various components of the image projection device 1000. That is, the image projection device 1000 according to the first embodiment is configured to project an image even at a very short distance.

In addition, it is assumed that a length of an optical path from the reflection unit 130 to an upper end of the screen unit 140 is referred to as a first length (shown in FIG. 2) and a length of an optical path from the reflection unit 130 to a lower end of the screen unit 140 is referred to as a second length (shown in FIG. 2). In the case of a general projector, a distance from the reflection unit to the screen unit is relatively longer than a distance from the panel unit to the reflection unit. That is, the ratio of the projection distance to the overall distance is greater than 1. Therefore, a ratio of the second length (refer to that shown in FIG. 2) in the general projector to the first length (refer to that shown in FIG. 2) in the general projector may have a value less than 1 but almost close to 1.

However, in the case of the image projection device 1000 according to the first embodiment, the ratio of the projection distance to the overall distance is less than 1. Therefore, the ratio of the second length to the first length has a smaller value than that of the general projector.

Meanwhile, an imaging magnification is also referred to as reduction ratio (RED) and may be calculated as a ratio of a height of an image formed on the reduction side to a height of an image formed on the magnifying side. In FIG. 2, the ratio of the first height (shown in FIG. 2) to the second height (shown in FIG. 2) is an imaging magnification. An imaging magnification of the general projector is 0.02 or less, whereas an imaging magnification of the image projection device 1000 according to the first embodiment is greater than 0.04. This means that although the imaging magnification has a larger value than that of the general projector, the image projection device 1000 according to the first embodiment may properly form an image.

Meanwhile, as described above, in the image projection device 1000 according to the first embodiment, the image projection device 1000 is configured so that an image may be properly formed even though projection is performed at a very short distance. This means that astigmatism or chromatic aberration may be effectively corrected even though projection is performed at a very short distance, which is made possible by the projection optical system 120 and the reflection unit 130. Hereinafter, the projection optical system 120 and the reflection unit 130 will be described in more detail.

Figure 3:
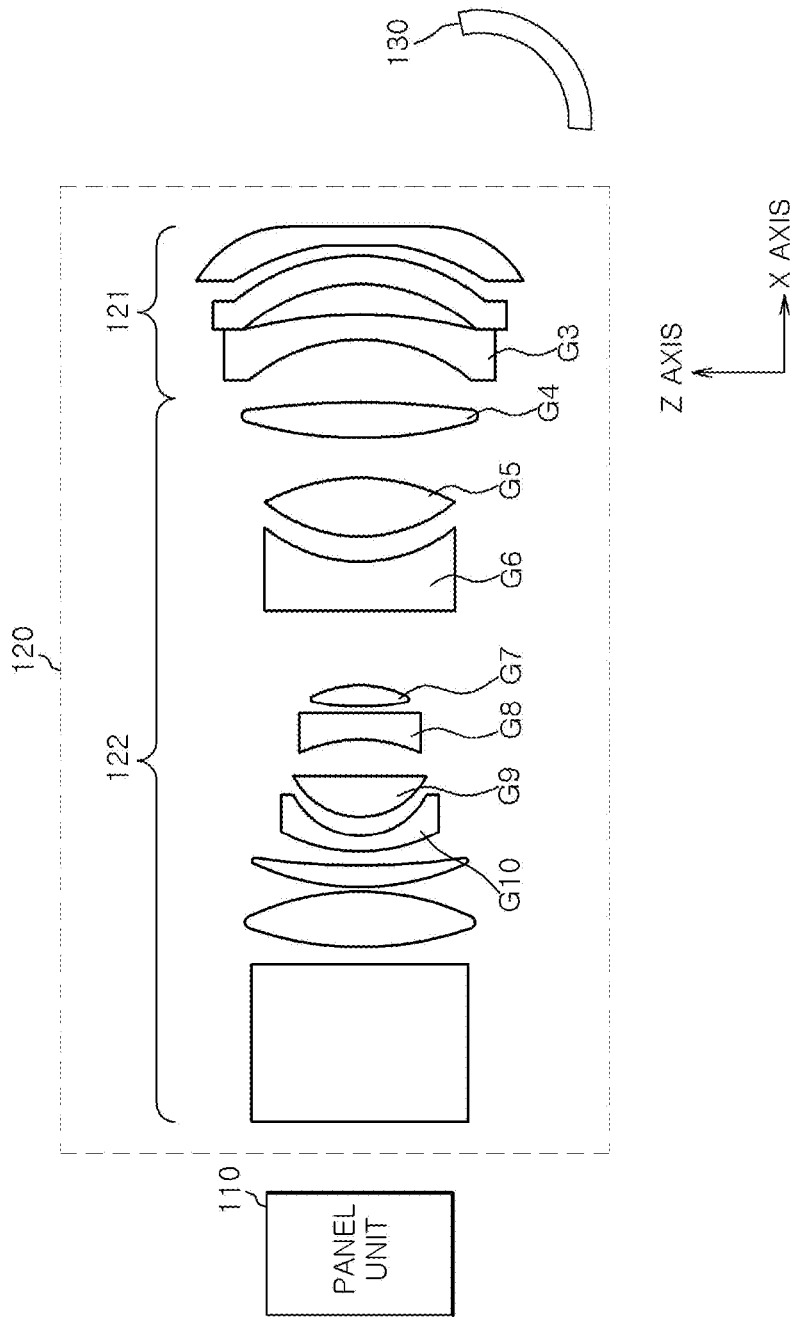
FIG. 3 is a schematic configuration diagram of an image projection device according to the first embodiment.

FIG. 3 is a schematic configuration diagram of the projection optical system 120 according to the first embodiment.

Referring to FIG. 3, the projection optical system 120 includes at least one aspherical lens 122 or at least one meniscus lens 121. Compared to the aspherical lens 122, the meniscus lens 121 may be disposed at a farther side (based on the distance measured along the direction parallel to the x-axis in FIG. 3) from the panel unit 110 but the present disclosure is not limited thereto.

The aspherical lens 122 and the meniscus lens 121 may improve an imaging magnification based on a projection distance and may play an effective role in correcting astigmatism. In particular, when at least three meniscus lenses 121 are provided, the meniscus lenses may be arranged to be continuously adjacent along a predetermined linear axis (x-axis in FIG. 3). In this case, the effect of improving the imaging magnification according to the projection distance may be maximized.

Meanwhile, when a plurality of aspherical lenses 122 are included in the projection optical system 120, focal lengths and absolute values of these aspherical lenses 122 may have the following relationship. Of course, according to an embodiment, the meniscus lens 121 may also have the following relationship, but hereinafter, it is assumed that the aspherical lens 122 has the following relationship.

Signs of the focal lengths of the lenses configuring the same pair are opposite to each other on the premise that two adjacent lenses among a plurality of lenses are considered as a pair A difference between the absolute values of the focal lengths of the lenses configuring the same pair has a value within 10% based on the absolute value of the focal length of any one of the paired lenses.

For example, as shown in FIG. 3, lenses configuring the projection optical system 120 may be paired as follows, and here, the focal lengths and signs of each pair may be as follows.

(G3,G4)=(−10.3, 10.7)
(g5,g6)=(4.4,−5.7)
(g7,g8)=(7.0,−7.1)
(g9,g8)=(3.2,−3.5)

When the lenses configuring the projection optical system 120 are configured to have the focal lengths and signs according to the aforementioned relationship, an effect of improving an imaging magnification according to the projection distance may be maximized and chromatic aberration may also be effectively corrected.

Next, the reflection unit 130 will be described.

Figure 4:
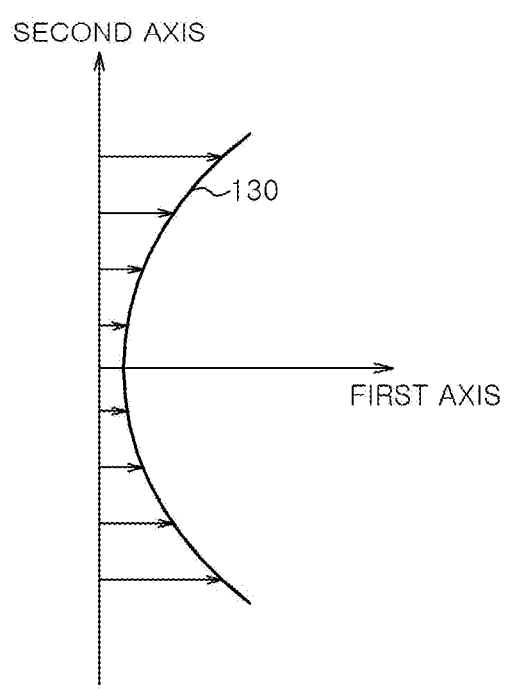
FIG. 4 is a schematic conceptual diagram showing a shape of a reflection surface of a reflection unit according to the first embodiment.

FIG. 4 is a schematic conceptual diagram of showing a shape of a reflection surface of the reflection unit 130 according to the first embodiment. However, FIG. 4 is only an example and the shape of the reflection surface of the reflection unit 130 is not limited to that illustrated in FIG. 4.

Referring to FIG. 4, the reflection unit 130 has a curved surface (sag) having a predetermined curvature. Referring to the distances to each point of the reflection unit 130 based on a second axis shown in FIG. 4, each distance is line-symmetrical with respect to a first axis shown in FIG. 4. In addition, each distance may be displayed or calculated by Equation 1 below.

$$z = \frac{cr^2}{1 + \sqrt{1 - (1+k)*c^2 r^2}} + AR1*r + AR2*r^2 + \ldots ARn*r^n + \ldots + AR30*r^{30}$$ (Equation 1)

In Equation 1 above, each parameter may be defined as follows.

z: Sag value parallel to first axis
c: curvature
k: conic constant
r: radial distance: $\sqrt{x^2+y^2}$
ARn: coefficient of $r^n$ ($1 \leq n \leq 30$)

The reflection unit 130 having such a curved surface is referred to as 'rotational symmetry'. When the reflection unit 130 is rotationally symmetric, the effect of improving the imaging magnification according to the projection distance may be maximized.

As described above, according to the first embodiment, astigmatism or chromatic aberration may be effectively corrected in the image projection device 1000 that projects an image at a very short distance.

Figure 5:
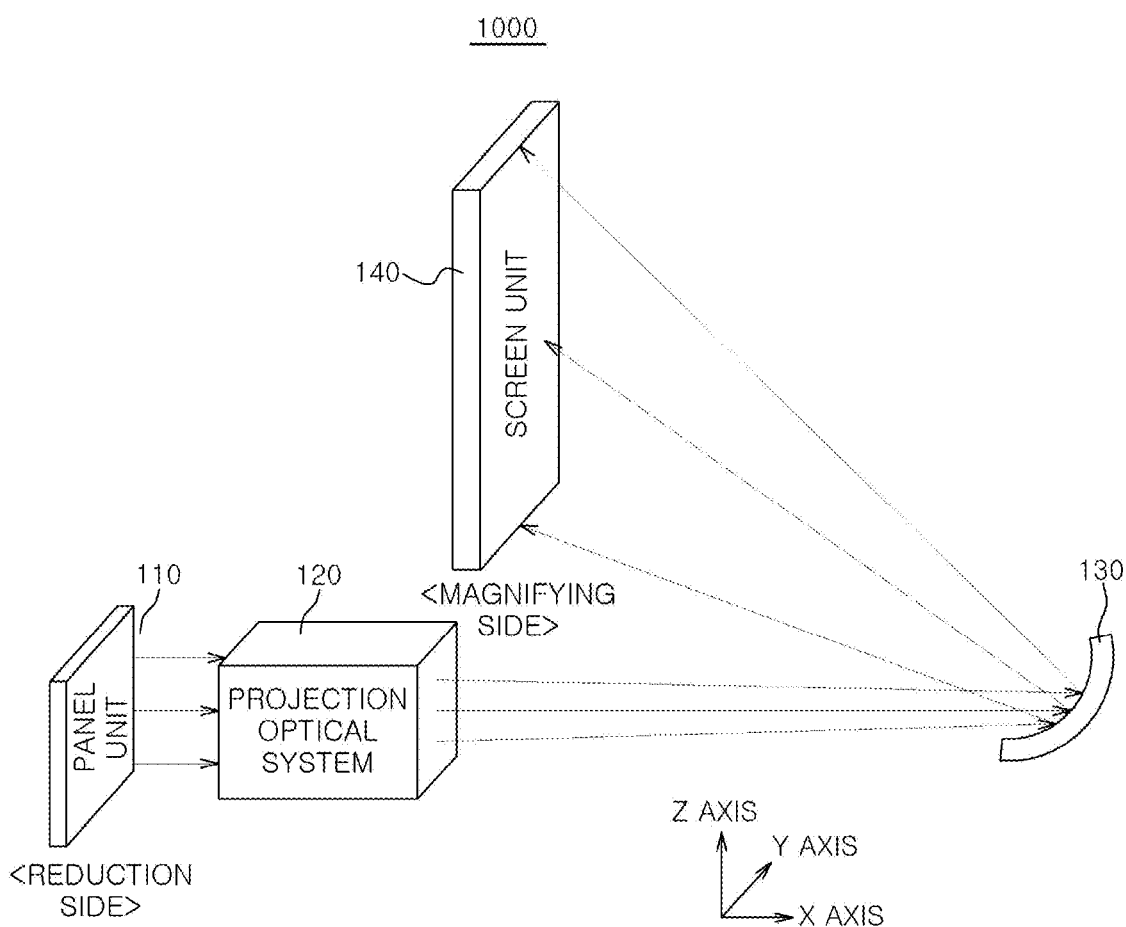
FIG. 5 is a schematic configuration diagram of an image projection device according to a second embodiment.

FIG. 5 is a schematic configuration diagram of an image projection device 1000 according to a second embodiment. Here, some of the components of the image projection device 1000 illustrated in FIG. 5 are substantially the same as the respective components of the image projection device 1000 according to the first embodiment described above. Accordingly, the description of the same components will refer to those described for the first embodiment. Hereinafter, among the components of the image projection device 1000 according to the second embodiment, the components different from those of the image projection device 1000 according to the first embodiment will mainly be described.

The panel unit 110 will be described. As shown in FIG. 5, the panel unit 110 itself or a portion of the panel unit 110 where an image is formed has a height in a vertical direction longer than a width in a horizontal direction. Hereinafter, the panel unit 110 formed in this way will be referred to as a vertical type.

The description of the projection optical system 120 will be based on the description of the first embodiment.

The reflection unit 130 includes a reflection surface. The configuration of the reflection unit 130 will be described in more detail with reference to FIGS. 7 and 8.

The screen unit 140 receives light rays reflected from the reflection surface of the reflection unit 130. The image is formed on the screen unit 140 using the light rays thus transferred. Here, the screen unit 140 itself or the portion where the image is formed in the screen unit 140 has a height in a vertical direction longer than a width in a horizontal direction as shown in FIG. 5. Hereinafter, the screen unit 140 formed in this way will be referred to as a vertical type.

The process of forming an image in the image projection device 1000 according to the second embodiment is the same as that in the image projection device 1000 according to the first embodiment.

Meanwhile, as described above, the panel unit 110 according to the second embodiment is of a vertical type. This means that, in the case of the panel unit 110 itself or a portion in which an image is formed in the panel unit 110, the height in the vertical direction is longer than the width in the horizontal direction. For example, in the case of the panel unit 110, the ratio of the length in the vertical direction to the length in the horizontal direction may be 16:9.

FIG. 6A shows a portion 51 of the panel unit 110 where an image is formed, an effective image circle 52, an image height 53, and an offset 54 when the panel unit 110 is the horizontal type. In addition, FIG. 6B according to the second embodiment shows a portion 111 of the panel unit 110 where an image is formed, an effective image circle 112, an image height 113, and offset 114 when the panel unit 110 is the vertical type.

When comparing FIG. 6A and FIG. 6B, the portion 51 where the image is formed in FIG. 6A reflects the shape of the horizontal type panel unit, whereas the portion 111 where the image is formed in FIG. 6B reflects the shape of the vertical type panel unit 110.

In addition, the effective image circle 112 shown in FIG. 6B is larger than the effective image circle 52 shown in FIG. 6A. Even in the case of the image height, the image height 113 shown in FIG. 6B is longer than the image height 53 shown in FIG. 6A.

That is, according to the second embodiment, the size of the effective image circle when the vertical type panel unit is employed is larger than the size of the effective image circle when the horizontal type panel unit is employed. Accordingly, even when the vertical type panel unit is employed, the degree of occurrence of pixel deterioration may be minimized.

In addition, as the size of the effective image circle increases, a possibility of occurrence of aberrations increases as much. In the second embodiment, when the projection optical system 120 is configured as shown in FIG. 3, such aberrations may be suppressed.

Next, the reflection unit 130 will be described. As described above, the reflection unit 130 is configured to receive light rays forming an image on the panel unit 110 from the projection optical system 120 and cause the light rays to be reflected toward the screen unit 140. In addition, the reflection surface refers to a portion formed on the reflection unit 130 so as to reflect light rays from the reflection unit 130.

Such a reflection surface may be formed on the reflection unit 130 in the following manner. First, at least two points predicted to receive light rays from the projection optical system are set in the reflection unit 130. Setting and prediction may be performed experimentally. The set points may include points that are maximally spaced apart from each other in the horizontal direction and points that are maximally spaced apart from each other in the vertical direction. The reflection surface may be provided in a rectangular shape on the reflection unit 130 by reflecting the positions or distances of points spaced apart with reference to the horizontal direction and the points spaced apart with reference to the vertical direction, but the shape is not limited thereto. In other words, the reflection surface is formed on the reflection unit 130 to include all points that reflect light rays within the reflection surface.

Hereinafter, a reflection surface operating in conjunction with a horizontal type panel unit, a reflection unit having such a reflection surface, and the reflection surface 131 operating in conjunction with the vertical type panel unit 110 and the reflection unit 130 having such a reflection surface 131 will be described.

Figure 7A:
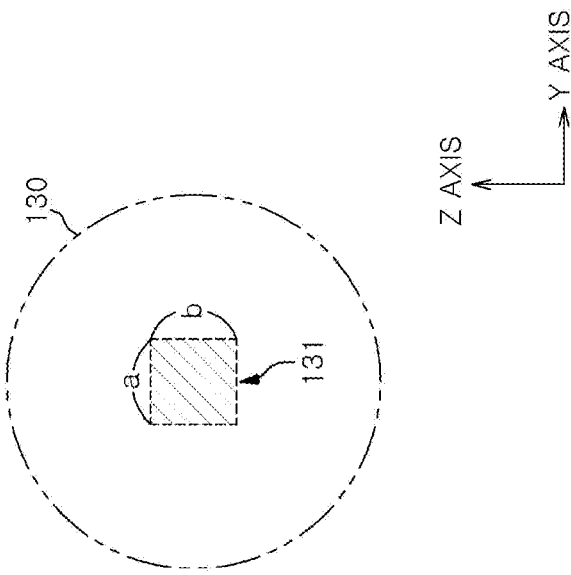
FIGS. 7A and 7B are schematic conceptual diagrams showing a region in which light is reflected from a reflection unit of a horizontal type image projection device and a region in which light is reflected from a reflection unit of a vertical type image projection device.

FIG. 7A shows a reflection surface 56 for reflecting light rays forming an image in a horizontal type panel toward a screen and a portion of the reflection unit 55 including the reflection surface 56.

Figure 7B:
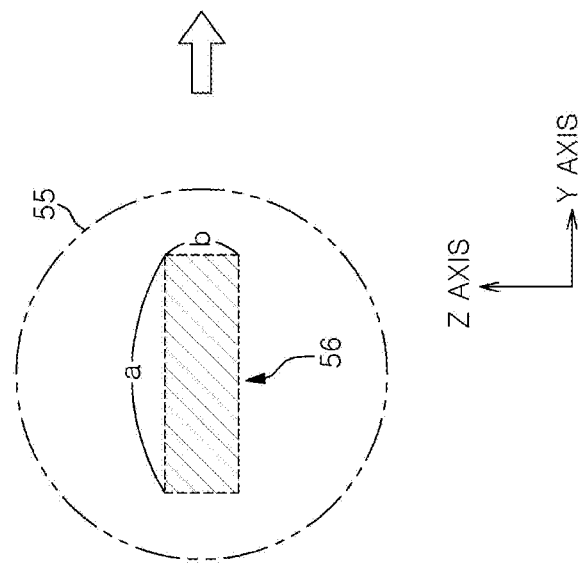

In addition, FIG. 7B shows a reflection surface 131 for reflecting light rays forming an image in the vertical type panel unit 110 toward the screen unit 140 and a portion of the reflection unit 130 including the reflection surface 131.

An aspect ratio of the length "a" of the reflection surface 56 in the horizontal direction (width) to the length "b" thereof in the vertical direction shown in FIG. 7A and an aspect ratio of the length "a" of the reflection surface 131 in the horizontal direction (width) to the length "b" in the vertical direction may be compared. FIG. 7A shows that the length "a" in the horizontal direction is longer than the length "b" in the vertical direction, but FIG. 7B shows that the length "a" in the horizontal direction and the length "b" in the vertical direction are similar. That is, in terms of aspect ratio, in the case of FIG. 7A, one side is longer than the other, but in the case of FIG. 7B, the lengths of both sides are similar. According to an embodiment, in the case of FIG. 7B, the ratio of the length "b" in the vertical direction to the length "a" in the horizontal direction may be greater than 0.7 and less than 1.3, but is not limited thereto.

Figure 8A:
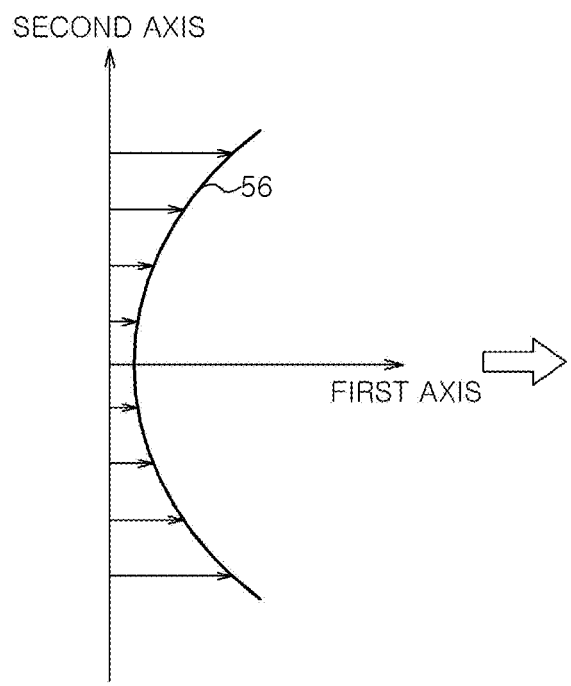
FIGS. 8A and 8B are schematic conceptual diagrams showing shapes of a reflection surface of a reflection unit of a horizontal type image projection device and a reflection surface of a reflection unit of a vertical type image projection device.
Figure 8B:
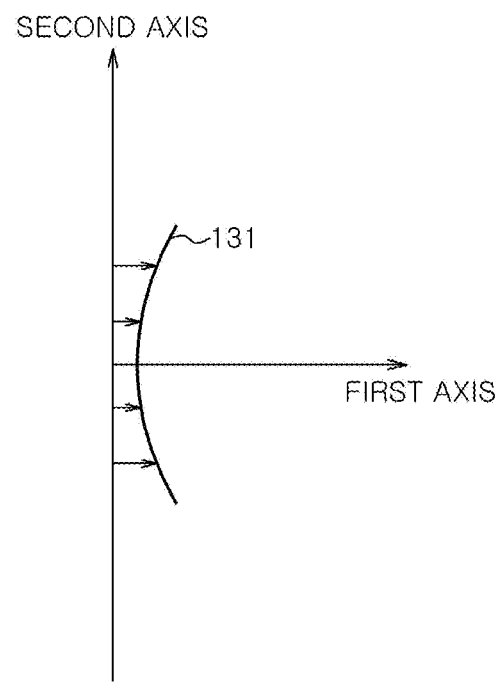

A process of forming each of the reflection surfaces 56 and 131 on each of the reflection units 55 and 130 will be described. When forming the reflection surface, a maximum value of sag is relatively smaller in the case of FIG. 7B than in FIG. 7A. This is because the maximum value of sag on the reflection surface increases as the length measured with reference to one arbitrary direction on the reflection surface increases. FIGS. 8A and 8B show this feature. Specifically, the reflection surface 56 and sag are shown in FIG. 8A. Here, sag is shown by a plurality of arrows connecting from the second axis to each point of the reflection surface 56. In FIG. 8B, the reflection surface 131 and sag are similarly shown. When comparing FIG. 8A and FIG. 8B, the maximum value of sag shown in FIG. 8B is smaller than the maximum value of sag (longest length among arrows) shown in FIG. 8A.

That is, according to the second embodiment, the reflection unit may be formed to have a reflection surface having a relatively small maximum sag value compared to the case of employing a horizontal type panel unit. Accordingly, in the manufacture of the reflection unit, sensitivity according to manufacture tolerance may be reduced, and thus, a yield for the manufacture of the reflection unit may be improved.

Figure 9:
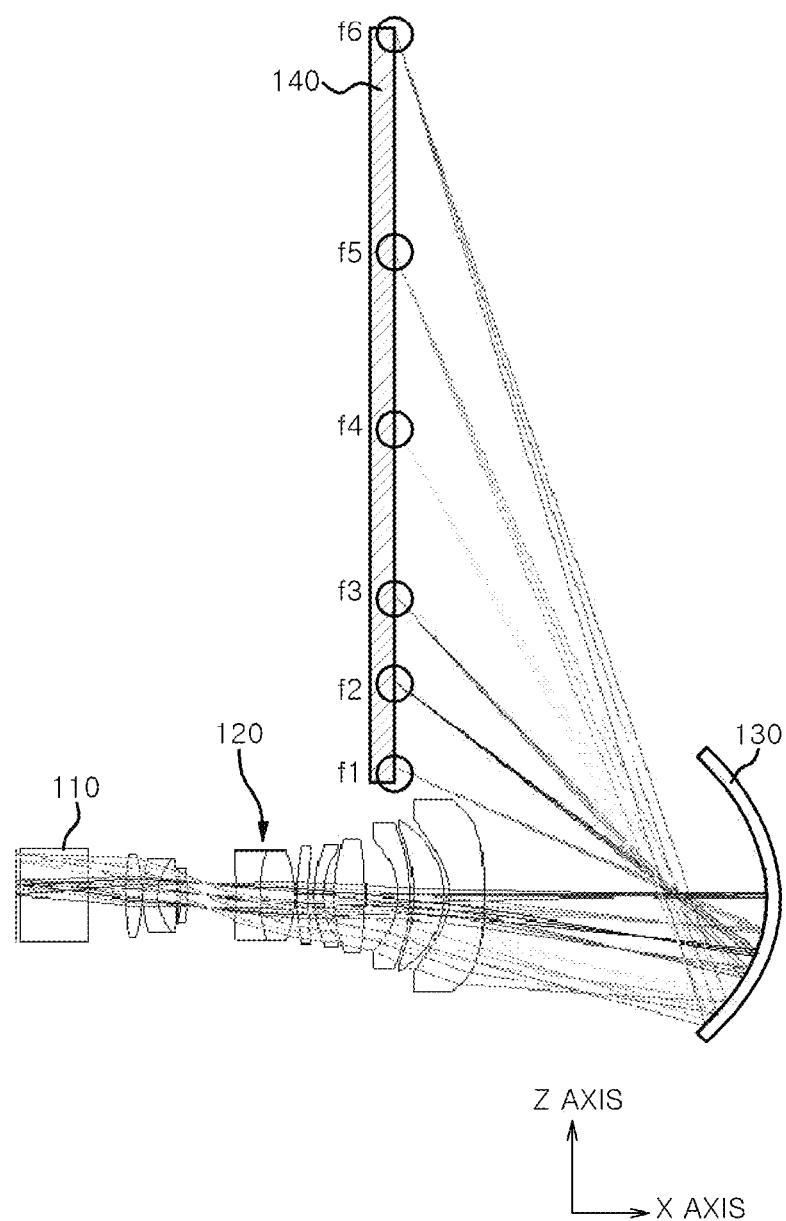
FIG. 9 is a schematic configuration diagram of an image projection device according to a third embodiment.

FIG. 9 is a schematic configuration diagram of an image projection device 1000 according to a third embodiment. Here, some of the components of the image projection device 1000 illustrated in FIG. 9 are substantially the same as the respective components of the image projection device 1000 according to the first or second embodiment described above. Accordingly, the description of the same components will refer to those described for the first embodiment. Hereinafter, among the components of the image projection device 1000 according to the third embodiment, those different from the components of the image projection device 1000 according to the first or second embodiments will be mainly described.

Referring to FIG. 9, the image projection device 1000 includes a panel unit 110, a projection optical system 120, a reflection unit 130, and a screen unit 140. In addition, the image projection device 1000 may include, for example, a power supply unit, a light source unit, and an illumination optical system as described above. In addition, the image projection device 1000 may include a case 200 in which these components are mounted.

Hereinafter, for convenience of description, a plurality of ray bundles emitted from the panel unit 110 are fielded as a first field f1, a second field f2, a third field f3, a fourth field f4, a fifth field f5, and a sixth field f6.

Assuming that an image formed by the light rays emitted from the panel unit 110 is referred to as a first image I1 and an image projected to the screen unit 140 is referred to as a second image I2, the second image I2 projected to the screen unit 140 is an enlarged image of the first image I1.

When the light rays emitted from the panel unit 110 reach the reflection unit 130 through the projection optical system 120, the reflection unit 130 may reflect the light rays and provide the same to the screen unit 140. To this end, the reflection unit 130 may include a planar reflecting mirror having a flat reflection surface and/or a curved reflecting mirror having a concave reflection surface. When the reflection unit 130 includes both the planar reflecting mirror and the curved reflecting mirror, light rays may be sequentially reflected by the planar reflecting mirror and the curved reflecting mirror to reach the screen unit 140.

If the reflection unit 130 includes the curved reflecting mirror, the curved reflecting mirror may be formed as a rotationally asymmetric reflection surface formed of a free curved surface or a rotationally symmetrical reflection surface that is rotationally symmetric with respect to a normal passing through a focal point of the curved reflecting mirror among normal lines perpendicular to the reflection surface. The reflection unit 130 may be implemented as a curved reflecting mirror in the form of a concave mirror having a reflection surface formed as a rotationally symmetrical reflection surface.

Figure 10:
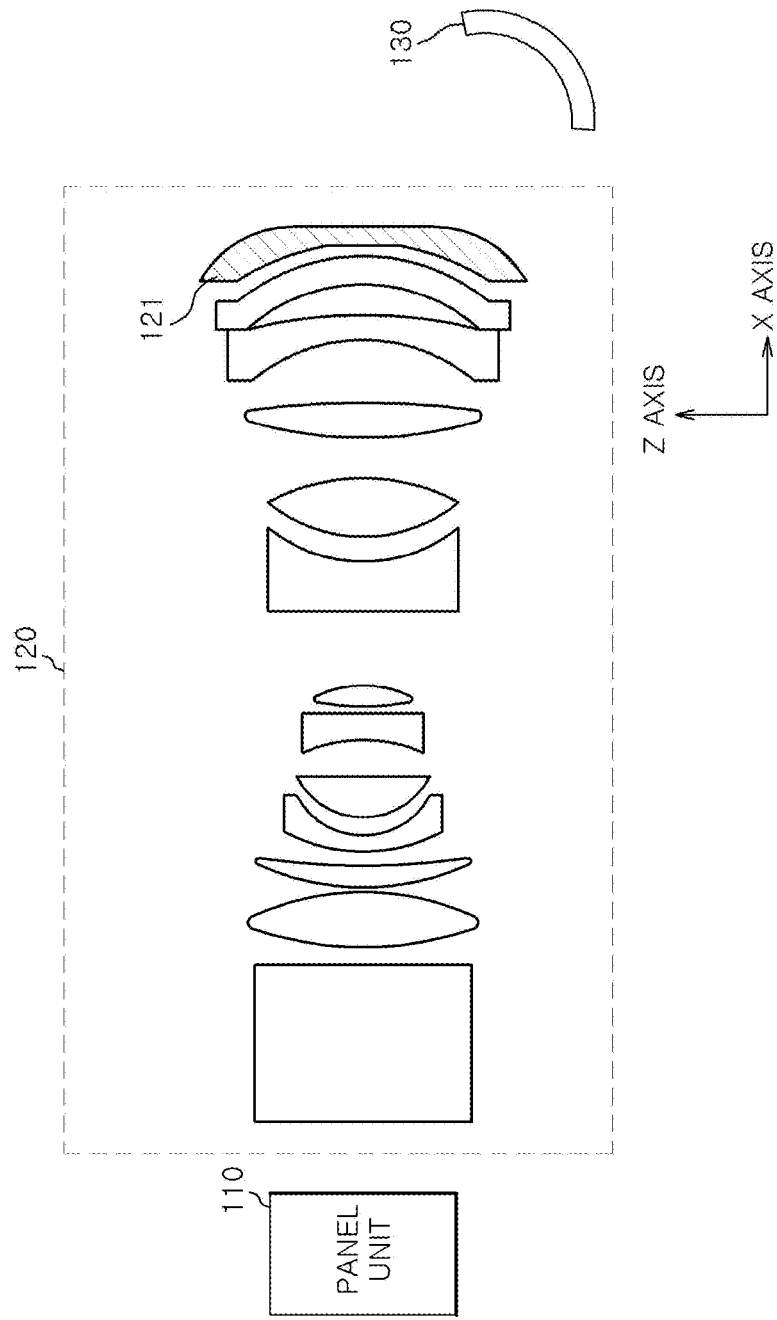
FIG. 10 is a schematic configuration diagram of an image projection device according to the third embodiment.

The projection optical system 120 may provide an optical path through which light rays emitted from the panel unit 110 reach the reflection unit 130. To this end, the projection optical system 120 may include a plurality of lenses that refract and exit incident light rays. FIG. 10 exemplarily illustrates a plurality of lenses included in the projection optical system. Here, FIG. 10 is a view substantially the same as that of FIG. 3, except that a magnifying lens 121 denoted by reference number 121 is shown in FIG. 10. The magnifying lens 121 will be described in detail later.

Hereinafter, image distortion that may occur in the image projection device 100 will be described with reference to FIGS. 11A and 11B.

Figure 11A:
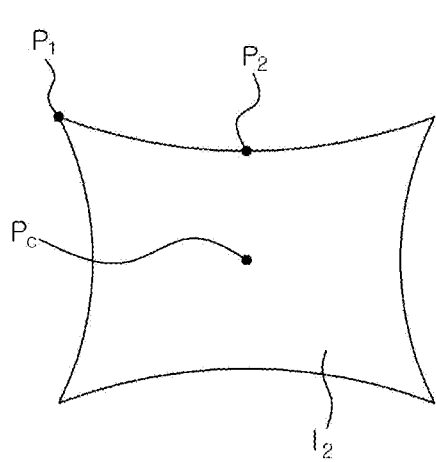
FIGS. 11A and 11B are schematic conceptual diagrams showing image distortion that may occur in the image projection device according to the third embodiment.
Figure 11B:
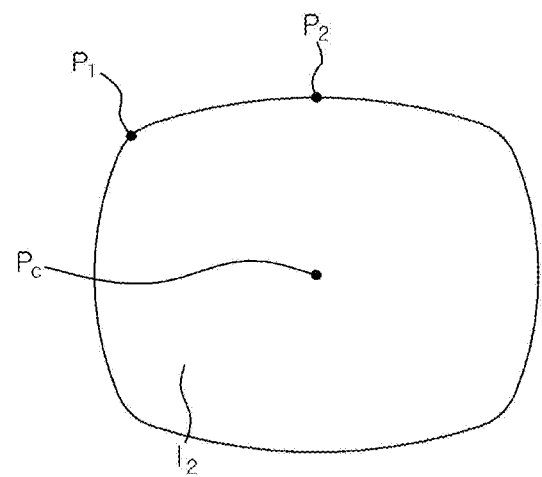

FIGS. 11A and 11B illustrate a second image $I_2$ projected to the screen unit 140 according to the third embodiment. It is assumed that the distorted images shown in FIGS. 11A and 11B would have a rectangular shape if they passed through an ideal optical system. In addition, for convenience, it is assumed that an offset of the optical system is 0, and thus the center of the image is formed at a point where a straight line extending the optical axis of the optical system and the screen meet.

FIG. 11A shows a second image $I_2$ in which so-called positive distortion has occurred, illustrating a case where a value of distortion at a first point $P_1$ corresponding to a vertex of the rectangle (preferably, upper vertex) which is an ideal shape is greater than a value of distortion at a second point $P_2$ corresponding to the center of the side of the rectangle (preferably, upper side).

In contrast, FIG. 11B shows a second image $I_2$ in which so-called negative distortion has occurred, illustrating a case where a value of distortion at the first point $P_1$ is smaller than a value of distortion at the second point $P_2$. However, the magnitude of the value of distortion, that is, an absolute value may be greater at the first point $P_1$ relatively far from the center $P_C$ of the second image $I_2$ that meets the optical axis in both FIG. A and FIG. B.

Since distortion of the projected image is a factor that hinders user's viewing, such distortion may be corrected through optical design. However, correction of distortion through optical design not only lowers a production yield of the image projection device 100 but also increases a volume, thus making it difficult to reduce a size of the image projection device 100.

In consideration of this, the image projection device 100 according to the third embodiment may correct distortion of an image through image processing while maintaining the distortion of the projection optical system 120. In this case, the distortion that may be corrected through image processing may be negative distortion, and when the distortion is projected onto the screen unit 140, the second image $I_2$ may be projected in the form of positive distortion. When the second image $I_2$ is projected to the screen in the form of FIG. 11B, the image projection device 100 may correct distortion through image processing so that the second image $I_2$ is not projected to the vertex area such as the first point P1.

However, in the case of distortion correction through image processing, the area in which the second image $I_2$ is projected is formed smaller than the area in which light is actually distributed, so that the amount of light of the second image $I_2$ may be reduced and light non-uniformity may occur accordingly. Since the light non-uniformity interferes with the user's viewing of the image, the image projection device 100 according to the third embodiment may include a projection optical system 120 that provides a projection image that the user may concentrate without recognizing the light non-uniformity. Here, the image in which the user does not recognize the light non-uniformity may refer to an image in which the brightest area is located at the center of the screen unit 140.

To this end, the projection optical system 120 according to the third embodiment may have a different design of the magnifying lens 121 (shown in FIG. 10) disposed adjacent to the reflection unit 130 among the plurality of lenses. Referring to FIG. 10, the magnifying lens 121 refers to a lens adjacent to the reflection unit 130 and may be referred to as a lens on the most magnifying side.

The magnifying lens 121 according to the third embodiment is an aspherical lens and may be designed such that a difference between an incident angle θ1 and an exit angle θ2 varies. Hereinafter, a design method of the magnifying lens 121 will be described with reference to FIG. 12.

Figure 12:
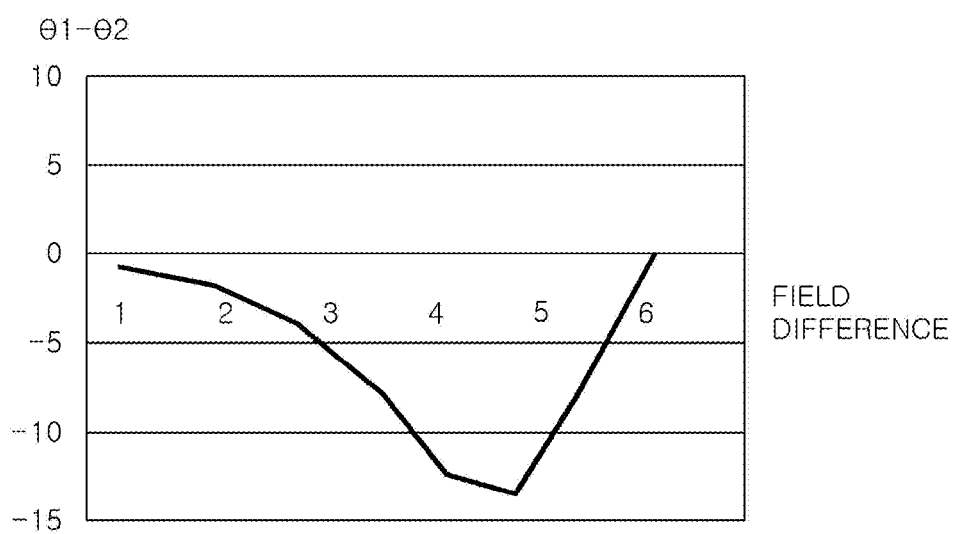
FIG. 12 is a graph showing a difference between an incident angle and an exit angle according to a region to which a field of a magnifying lens reaches according to the third embodiment.

FIG. 12 is a graph showing a difference between an incident angle and an exit angle according to an area that a field of the magnifying lens reaches according to the third embodiment.

The magnifying lens 121 may be divided into an inner central region and an outer region based on a reference point. Here, the reference point refers to a point in the magnifying lens 121 determined according to a position on which a light ray corresponding to the center of the first image I1 among light rays emitted by the panel unit 110 is incident.

Referring to FIG. 9, when a position on which the fourth field f4, which is a bundle of yellow light rays corresponding to the center of the first image I1, among incident surfaces of the magnifying lens 121, is confirmed, a distance from the incident surface of the magnifying lens 121 to the corresponding position may be determined as a reference point.

When the magnifying lens 121 is divided into the central region and the outer region based on the reference point, the magnifying lens 121 may be designed such that a difference between the incident angle θ1 and the exit angle θ2 at the boundary between the central region and the outer region is minimized. As a result, the difference between the incident angle θ1 and the exit angle θ2 of the magnifying lens 121 may decrease in a direction away from the reference point. In other words, the difference between the incidence angle θ1 and the exit angle θ2 of the magnifying lens 121 increases in a direction away from the center in the central region, and the difference between the incident angle θ1 and the exit angle θ2 decreases in a direction away from the center in the outer region.

Referring to FIG. 12, it can be seen that the difference between the incident angle θ1 and the exit angle θ2 changes according to an incident position of the magnifying lens 121 to which the first field f1 to the sixth field f6 is incident. In particular, in the graph of FIG. 12, the difference between the incident angle θ1 and the exit angle θ2 is the largest at the reference point where the fourth field f4 is incident, and while moving from the position where the third field f3 is incident to the position where the first field f1 is incident, the difference between the incident angle θ1 and the exit angle θ2 decreases to approach 0, and the difference between the incident angle θ1 and the exit angle θ2 decreases to approach 0, while moving from the position where the fifth field f5 is incident to the position where the sixth field f6 is incident.

For the design as described above, a refractive index, a curvature, and a conic coefficient of the magnifying lens 121 may be determined.

By controlling a height of the light ray projected onto the screen unit 140 through the projection optical system 120 including the magnifying lens 121 designed as described above, a form of distortion may be determined.

Furthermore, since the projection optical system 120 is designed based on the degree of distortion according to the distance from the optical axis, the image projection device 100 may provide an image in which light non-uniformity is not recognized by the user. Hereinafter, a method of designing the projection optical system 120 based on the degree of distortion according to a distance from an axis will be described with reference to FIGS. 13 to 16.

Figure 13:
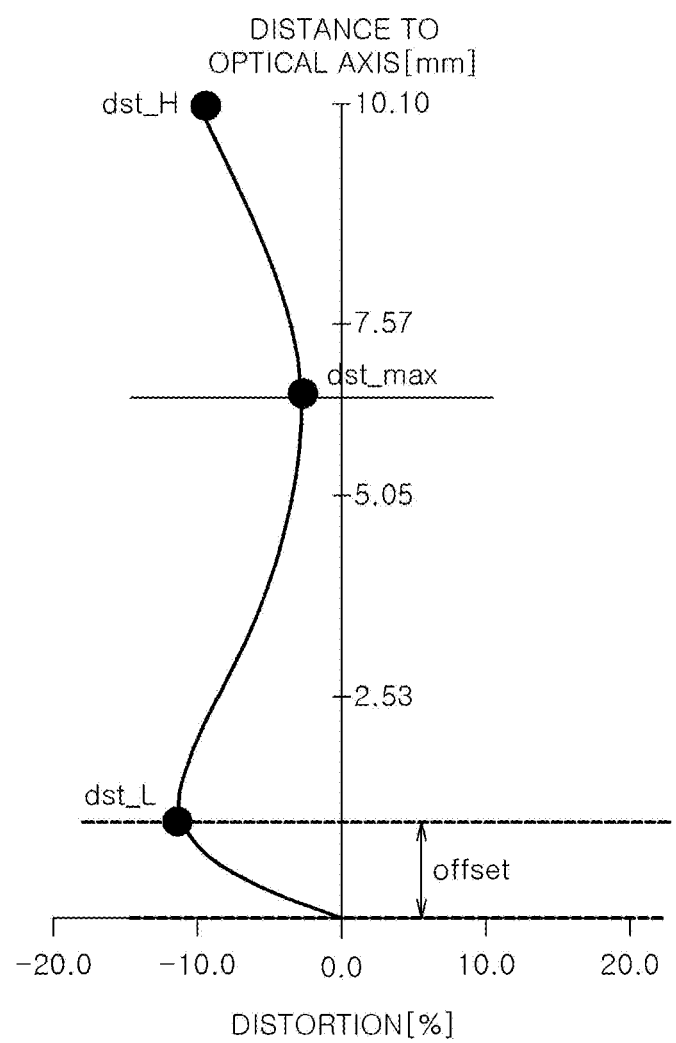
FIG. 13 is a distortion graph based on a distance from an optical axis of a projection optical system having positive distortion.
Figure 14:
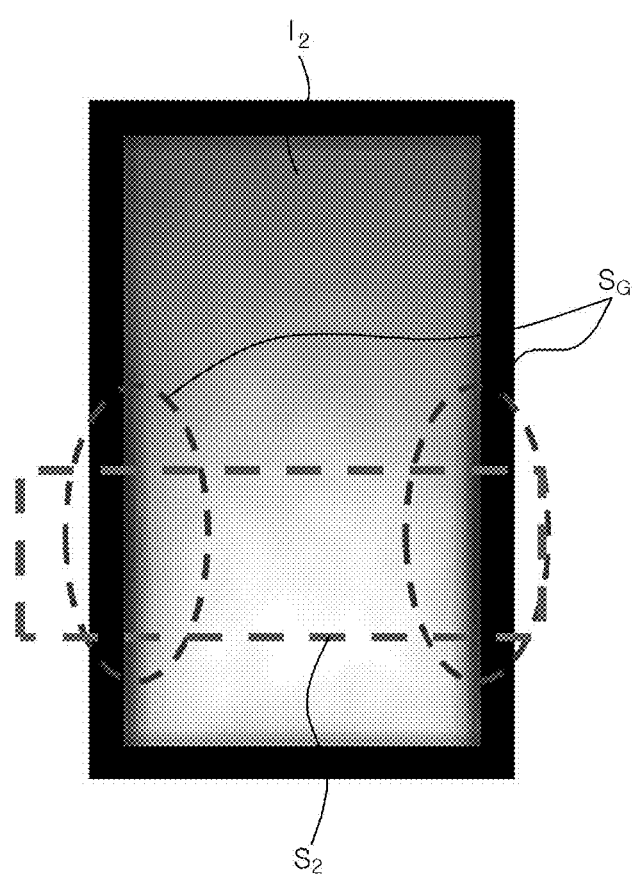
FIG. 14 illustrates a second image finally projected by an image projection device including the projection optical system according to FIG. 13.
Figure 15:
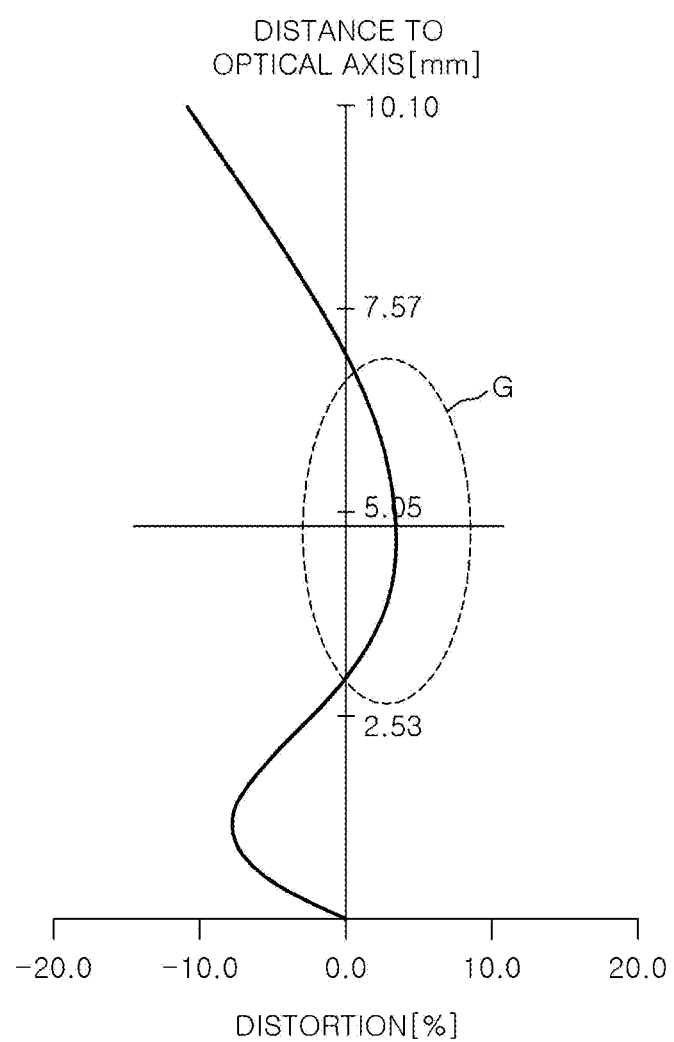
FIG. 15 is a distortion graph based on a distance from an optical axis of a projection optical system having negative distortion.
Figure 16:
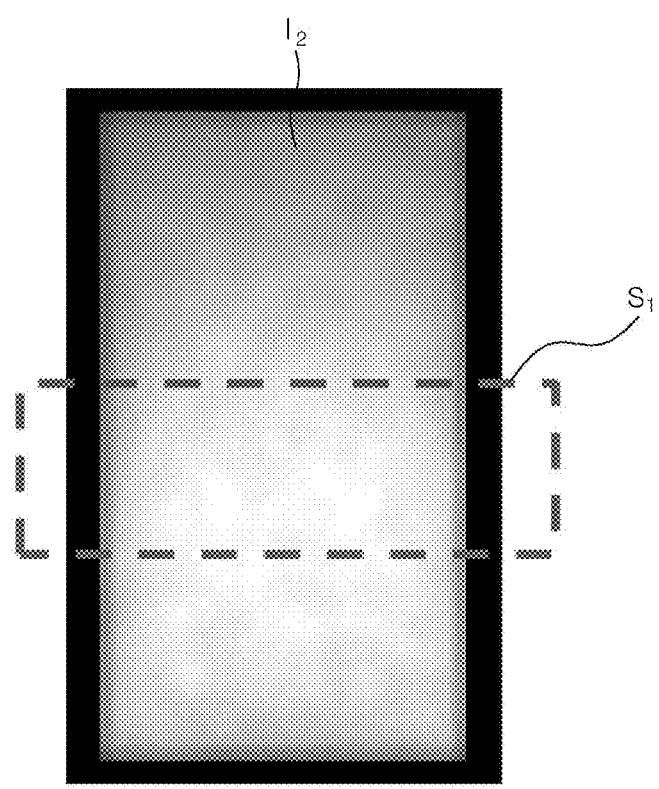
FIG. 16 illustrates a second image finally projected by an image projection device including the projection optical system according to FIG. 15.

FIG. 13 is a distortion graph over a distance from an optical axis of a projection optical system having positive distortion, and FIG. 14 is a diagram illustrating a second image finally projected by an image projection device including the projection optical system according to FIG. 13. FIG. 15 is a distortion graph over a distance from an optical axis of the projection optical system according to the third embodiment having negative distortion, and FIG. 16 is a diagram illustrating a second image finally projected by the image projection device including the projection optical system according to FIG. 15. In the case of FIGS. 13 to 16, it is assumed that there is an offset.

Referring to FIG. 13, the projection optical system 120 may have positive distortion with respect to a light ray corresponding to a region G near a position spaced apart by 5.05 mm from an optical axis in the first image $I_1$. In addition, the projection optical system 120 may confirm that distortion of the light ray corresponding to the region G in the first image $I_1$ is the least.

As a result, referring to FIG. 14, it can be seen that S2, which is the brightest region of the second image $I_2$ projected onto the screen according to the light ray having the least distortion, is located at a lower end of the entire second image $I_2$. This is a result that occurs because the region G is located at a region less than the center of the image height 10.10 mm of the first image $I_1$.

In addition, as a result of the positive distortion, in the SG, which is a lateral region of the second image $I_2$, light non-uniformity due to insufficient amount of light may be confirmed.

To solve this problem, the projection optical system 120 according to the third embodiment is designed according to Equation 2 to Equation 5 below, and the graph of FIG. 15 may be obtained as a result thereof.

$$dst_{max} \leq 0 \qquad \text{(Equation 2)}$$

Here, dst_max denotes distortion of a light ray having the least distortion among light rays corresponding to the first image $I_1$. That is, Equation 2 corresponds to a condition to have negative distortion.

$$|min(dst\_H, dst\_L) - dst\_max| \leq k1 \qquad \text{(Equation 3)}$$

Here, dst_H may denote distortion of a ray farthest from the optical axis among the light rays corresponding to the first image $I_1$, and dst_L may denote distortion of a light ray closest to the optical axis among the light rays corresponding to the first image $I_1$. That is, Equation 3 corresponds to a condition in which a difference between maximum distortion and minimum distortion for the light ray corresponding to the first image $I_1$ is less than or equal to a reference deviation k1.

$$f{-}1(dst\_max) \geq average(f{-}1(dst\_L), f{-}1(dst\_H)) \qquad \text{(Equation 4)}$$

Here, f−1(x) denotes a distance from the optical axis of the position of the first image $I_1$ corresponding to a light ray with distortion x. In other words, Equation 4 corresponds to a condition in which a light ray in which maximum distortion occurs corresponds to a region above the center of the first image $I_1$.

$$(dst\_H - dst\_L)/(min(dst\_H, dst\_L)) \leq k2 \qquad \text{(Equation 5)}$$

Equation 5 corresponds to a condition in which, among distortion of a light ray farthest from the optical axis and distortion of a light ray closest to the optical axis, among light rays corresponding to the first image $I_1$, a difference between the two compared to a smaller value is equal to or less than the predetermined reference ratio k2, that is, a condition in which a value of distortion for the light ray farthest from the optical axis and a value of distortion for the light ray closest to the optical axis, among the light rays corresponding to the first image $I_1$, are similar.

When the projection optical system 120 is designed according to the aforementioned conditions, the second image $I_2$ as shown in FIG. 16 may be projected to the screen unit 140. Referring to FIG. 16, by forming the brightest area S1 of the projected second image $I_2$ in a height equal to or more than that of the center, it is possible to prevent the user from recognizing light non-uniformity.

So far, the case where the image projection device 100 includes the screen unit 140 has been described, but the image projection device according to another embodiment may not include the screen unit. In this case, the image projection device may project the second image $I_2$ onto an externally and separately provided screen device or may project the second image $I_2$ onto an object which may serve as a screen such as a wall.

FIG. 17 is a flowchart of a method of manufacturing an image projection device according to the third embodiment.

First, the panel unit 110 that emits light rays corresponding to the first image $I_1$ may be prepared (S100). The panel unit 110 may be implemented through devices such as liquid crystal display (LCD), light emitting diode (LED), plasma display panel (PDP), organic light emitting diode (OLED), or cathode ray tube (CRT).

Then, the magnifying lens 121 in which a difference between an incident angle and an exit angle decreases in a direction away from a reference point may be prepared (S110). Here, the magnifying lens 121 may be an aspherical lens, and a refractive index, a curvature, and a conic coefficient may be determined in order to adjust a difference between the incident angle and the exit angle.

When the magnifying lens 121 is prepared, the projection optical system 120 may be configured with a plurality of lenses including the magnifying lens 121 that refracts a light ray emitted by the panel unit 110 (S120). The plurality of lenses may be arranged in one direction on an optical path.

Thereafter, the reflection unit 130 for reflecting the light ray refracted by the projection optical system 120 may be prepared adjacent to the magnifying lens 121 (S130).

Finally, the screen unit 140 that displays the second image $I_2$ corresponding to the light ray reflected by the reflection unit 130 may be prepared (S140). In this case, the second image $I_2$ is an enlarged image of the first image $I_1$ and may be an image in which the user does not recognize light non-uniformity even though distortion correction is performed by image processing.

The image projection device according to the third embodiment described above may reduce discomfort caused by light non-uniformity that the user may feel from a projected image by controlling distortion at the center of the projected image. In addition, by improving inconvenience due to light non-uniformity of the projected image, while maintaining distortion aberration of the projection optical system and correcting distortion of the projection image through image processing, a miniaturization of the image projection device may be implemented.

Meanwhile, the configuration of the image projection device according to any one of the image projection devices according to the first to third embodiments described above may be included in the image projection device according to the other embodiment and may replace some of the components of the image projection device according to the other embodiment.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An image projection device comprising:
a panel configured to emit light rays;
a projection optical system configured to receive the light rays emitted from the panel and to refract the light rays, the projection optical system comprising a set of aspherical lenses and a set of meniscus lenses, the set of aspherical lenses placed closer to the panel than the set of meniscus lenses;

a reflector having a reflection surface for receiving the light rays refracted by the projection optical system and reflecting the light rays; and a screen configured to display an image upon receiving the light rays reflected from the reflection surface, wherein the panel, the projection optical system, the reflector, and the screen are arranged such that a distance of a shortest path among paths extending from the panel to the reflector through the projection optical system along a predetermined linear axis is longer than a distance of a longest path among paths extending from the reflector to the screen along the predetermined linear axis.

2. The image projection device of claim 1, wherein the set of meniscus lenses comprises at least three meniscus lenses arranged adjacent to each other in a direction parallel to the linear axis.

3. The image projection device of claim 1, wherein the set of aspherical lenses and the set of meniscus lenses comprise a plurality of lenses that form a pair, the plurality of lenses including lenses having a ratio of an absolute value for a difference between focal lengths of one lens and the other lens, among lenses that form the pair with opposite focal length signs, to an absolute value of the focal length of the one lens is 0.1 or less.

4. The image projection device of claim 1, wherein a height of the panel in a vertical direction in an image generation surface of the panel is longer than a width of the panel in a horizontal direction.

5. The image projection device of claim 1, wherein the reflection surface is provided in the reflector by reflecting positions of points which are maximally spaced apart from each other with respect to a width in a horizontal direction and positions of points which are maximally spaced apart from each other with respect to a height in a vertical direction, among at least two points included in the reflector predicted to receive and reflect the refracted light rays.

6. The image projection device of claim 5, wherein a ratio of distances between the points which are maximally spaced apart from each other with respect to the height in the vertical direction to distances between the points which are maximally spaced apart from each other with respect to the width in the horizontal direction is greater than 0.7 and smaller than 1.3.

7. The image projection device of claim 1, wherein the reflection surface has positive refractivity.

8. The image projection device of claim 1, wherein the projection optical system further comprises a magnifying lens.

9. The image projection device of claim 8, wherein a difference between an incident angle and an exit angle of the magnifying lens decreases in a direction away from a predetermined reference point on the magnifying lens.

10. The image projection device of claim 8, wherein a difference between an incident angle and an exit angle of the magnifying lens is determined based on a refractive index, curvature, and an asphericity of the magnifying lens.

11. The image projection device of claim 1, wherein the projection optical system is provided to have negative distortion.

12. The image projection device of claim 1, wherein when a predetermined offset is present between an optical axis and a center of the image in the projection optical system, a first distortion for a first light ray farthest from the optical axis among the light rays corresponding to the image, a second distortion for a second light ray closest to the optical axis among the light rays corresponding to the image, and a third distortion for a third light ray of the least distortion among the light rays corresponding to the image has negative distortion.

13. The image projection device of claim 12, wherein the projection optical system is provided such that a deviation between the third distortion and a smaller one between the first distortion and the second distortion is equal to or less than a reference deviation, the third light ray is a light ray corresponding to a region higher than a center of the image, and a ratio of a difference between the first distortion and the second distortion to the smaller one is equal to or less than a predetermined reference value.

14. An image projection device comprising:

a panel longer in height in a vertical direction than in width in a horizontal direction;

a projection optical system configured to receive light rays emitted from the panel and to refract the light rays, the projection optical system comprising a set of aspherical lenses and a set of meniscus lenses, the set of aspherical lenses placed closer to the panel than the set of meniscus lenses; and a reflector having a reflection surface receiving a plurality of light rays forming an image on the panel and reflecting the light rays, wherein the reflection surface is provided in the reflector by reflecting positions of points which are maximally spaced apart from each other with respect to the width in the horizontal direction and positions of points which are maximally spaced apart from each other with respect to the height in the vertical direction, among at least two points included in the reflector predicted to receive the plurality of light rays forming the image on the panel and reflect the light rays.

15. The image projection device of claim 14, wherein a ratio of distances between the points which are maximally spaced apart from each other with respect to the height in the vertical direction to distances between the points which are maximally spaced apart from each other with respect to a width in the horizontal direction is greater than 0.7 and smaller than 1.3.

16. The image projection device of claim 14, wherein the reflection surface has positive refractivity.

17. The image projection device of claim 14, wherein the set of meniscus lenses are arranged adjacent to each other in a direction parallel to a predetermined linear axis.

\* \* \* \* \*